June 15, 1937.  J. BADEKER  2,084,235
METALLIC ROD PACKING
Filed Dec. 9, 1935  2 Sheets-Sheet 1
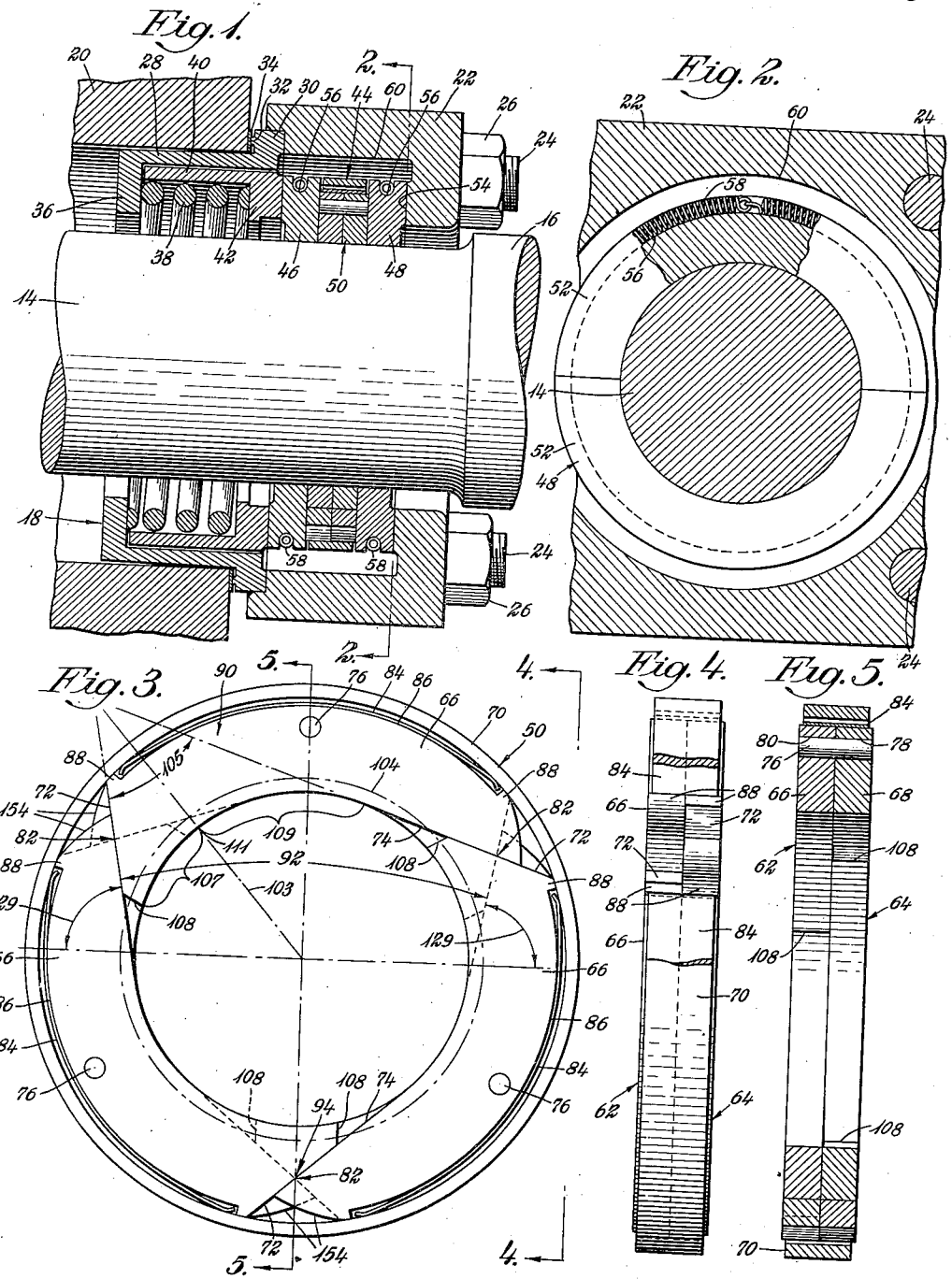
John Badeker
INVENTOR
BY Victor J. Evans & Co.
HIS ATTORNEYS June 15, 1937.   J. BADEKER   2,084,235
METALLIC ROD PACKING
Filed Dec. 9, 1935   2 Sheets-Sheet 2

John Badeker.
INVENTOR
BY Victor J. Evans & Co.
HIS ATTORNEYS

Patented June 15, 1937

2,084,235

UNITED STATES PATENT OFFICE 2,084,235

METALLIC ROD-PACKING

John Badeker, Chicago, Ill.

Application December 9, 1935, Serial No. 53,664

7 Claims. (Cl. 286—24)

My invention relates to the art of packing, and has among its objects and advantages the provision of an improved metallic rod packing.

In the accompanying drawings:

Fig. 1 is a sectional view of a rod packing assembly according to my invention;

Fig. 2 is a sectional view along the line 2—2 of Fig. 1;

Fig. 3 is a view illustrating the segments of the rod packing in association with their carrier ring;

Fig. 4 is a view taken from the position indicated by line 4—4 of Fig. 3, with certain parts broken away for the purpose of illustration;

Fig. 5 is a sectional view along the line 5—5 of Fig. 3;

Figure 6:
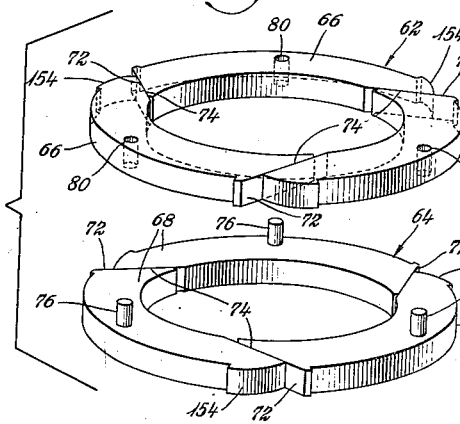
Fig. 6 is a perspective view illustrating the segment units in separated relation.

In the embodiment selected to illustrate my invention, I make use of a piston rod 14 including the usual enlarged end 16 for connection with the cross head. The piston rod 14 passes through the stuffing box 18 in the cylinder head 20. A gland 22 is detachably connected with the cylinder head 20 through the medium of stud bolts 24 and nuts 26. Within the stuffing box 18 I position a spring follower 28 having a flange 30 clamped between the gland 22 and the cylinder head 20.

One side of the flange 30 is provided with a rib 32 bearing against a gasket 34 lying adjacent the cylinder head. An effective seal is provided through the medium of the rib 32 and the gasket 34. The inner end of the spring follower 28 terminates in a flange 36 for providing a seat for one end of the compression spring 38.

Within the spring follower 28 I mount a spring cup 40 which has a loose fit with the spring follower and is provided with a flange 42 against which the opposite end of the compression spring 38 rests. The compression spring 38 operates to press the spring cup 40 yieldingly toward the packing unit 44 within the gland 22.

The opening through the gland 22 and the flanges 36 and 42 are normally aligned axially with the piston rod 14 and are of such diameter as to permit the enlarged end 16 to pass therethrough, thereby facilitating the assembly of the parts by passing them longitudinally over the enlarged end of the rod.

The packing unit 44 comprises a pair of guard rings 46 and 48 between which a packing ring 50 is positioned. Each guard ring 46 and 48 is divided diametrically into two symmetrical parts 52 (see Fig. 2). These rings are bored to fit loosely upon the piston rod 14 without having fluid-tight relation therewith. In Fig. 1, I illustrate the guard ring 46 as being positioned adjacent the flange 42 and one side of the packing ring 50, while the guard ring 48 is positioned between the packing ring 50 and the face 54 of the gland 22. Fluid-tight contact is established between the flange 42 and the guard ring 46 as well as between the guard ring 48 and the face 54.

Each of the guard rings 42 and 48 is provided with a peripheral groove 56 within which a coiled endless spring 58 is positioned. The springs operate to hold the parts 52 in assembled relation about the piston rod 14, but permit the parts to be separated when the springs are removed.

I illustrate the guard rings 46 and 48 as having an outside diameter less than the bore 60 in the gland 22 which houses the rings. Thus, accommodation is provided for adjustment of the rings at right angles to the horizontal axis of the gland to accommodate lateral play of the piston rod.

The packing ring 50 is made up of two ring units 62 and 64, each comprising a group of three segments 66 and 68, respectively (see Fig. 6). The ring units 62 and 64 are enclosed peripherally by a carrier ring 70 (see Fig. 3). The width of the carrier ring is slightly less than the combined thicknesses of the ring units 62 and 64 so that the spring cup pressure between the guard rings 46 and 48 is transmitted to the ring units. All the segments are identical in construction, each including flat parallel side faces and plane end faces 72 and 74 extending substantially tangent to the bore of the ring units. The end face 72 of each segment is arranged in abutting relation with the end face 74 of the adjacent segment.

Each segment 68 is provided with a dowel pin 76 which is pressed into a hole 78 for fastening purposes, while each segment 66 is provided with a hole 80 for loosely receiving the dowel pin 76 carried by one of the segments 68. Thus, one segment 66 is pivotally connected with one segment 68 in such a manner that the ring units 62 and 64 are restrained from relative rotary motion about the axis of their bores. However, each segment 66 and 68 of a pivotally connected unit is free to move relatively to the other segment about the axis of its dowel pin 76.

In assembling the ring units 62 and 64, the units are reversed so that the end faces 72 and 74 of the segments in one ring unit are arranged in crossed relation with respect to the same end faces in the other ring unit as indicated at 82, in Fig. 3. In arranging the ends of the segments in the manner indicated at 82, I provide an overlapping relation between the segments which is fluid-tight. At the same time, the faces 72 and 74 fit in close relation to provide fluid-tight contact.

Means is provided for shifting segments to compensate wear of the ring units 62 and 64. Adjustment of the ring units is attained through the medium of springs 84 housed between the segments 66 and 68 and the carrier ring 70. While the abutting ends of the segments may be shifted relatively to each other, the arrangement is such that the contacting end surfaces 72 and 74 maintain parallel and abutting relation at all times, thereby providing a fluid-tight condition.

Referring to Figs. 3 and 6, the segments 66 and 68 are recessed at 86 to provide spaces for the springs 84. The recesses 86 terminate short of the ends of the segments to provide abutments 88 which are spaced slightly from the carrier ring 70 when the packing ring is first applied to the piston rod 14.

The recesses in the segments 66 are coextensive with the same recesses in the segments 68, and the recesses in the two segments are arranged so that one spring 84 may be associated with two segments connected as a unit by its respective dowel pin 76. Referring to Figs. 3 and 5, the springs 84 are of less width than the combined thicknesses of the ring units 62 and 64 so as to prevent the spring cup pressure from impairing the action of the springs.

In Fig. 3, I illustrate the springs 84 as conforming substantially to the curvature of the segments. Before insertion the springs are substantially straight and the ends of the springs substantially abut the abutments 88 when placed in position. The ends of each spring are arranged to maintain the same in abutting relation with the abutments 88 in all positions of adjustment, see Fig. 7. The tension of the springs urges the segments against the piston rod 14, for maintaining sealing relation therewith.

Referring to Fig. 3, the dowel pin 76 associated with the segment unit 90 bisects the angle 92 which defines the ends 72 of the two segments 66 and 68 in that unit. The ring units 62 and 64 each comprise three segments. The dowel pin 76 of the segment unit 90 has its axis aligned with a line drawn through the axis of the ring assembly and the intersection 82 which I have indicated at 94.

Figure 7:
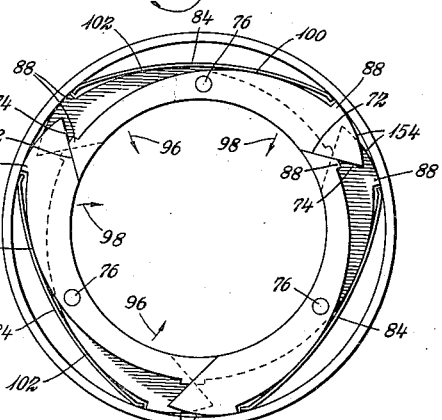
Fig. 7 is a view illustrating the manner in which the segments embrace the piston rod.

Fig. 7 illustrates adjustment of the segments 66 and 68 caused by wear. The segments 66 and 68 in each unit are free to pivot about their respective dowel pins 76 in different directions. In this view, the segments 66 have pivotal movement in the direction indicated by the arrows 96, while the segments 68 have pivotal movement in the direction indicated by the arrows 98. At the same time the segment units are shiftable bodily in a radial direction with respect to the axis of the packing ring, with the axis of the dowel pin of each unit moving in a straight radial line toward the packing ring axis. The springs 84 bear against the segments 66 at points indicated generally at 100, while the springs have pressure engagement with the segments 68 at points indicated generally at 102.

In connecting the segments for pivotal action in pairs, I provide an arrangement in which shifting of the segments in one ring unit is balanced by the action of the segments in the other ring unit. In Fig. 3, line 103 bisects the angle 105 defining the end faces 72 and 74 of the segment 66 in unit 90. Each segment has its ends 72 and 74 defining the same angle. In the absence of the dowel pin 76, forces transmitted to the segments in operation are such as to tend to separate the abutting ends 72 and 74 of adjoining segments. The area 107 is considerably less than the area 109, so that the additional forces transmitted to the area 109 tend to shift the segments 66 in unit 90 to the right when viewing Fig. 3. Slight separation between the adjoining ends 72 and 74 of the segments results in a large loss of steam. I prevent separation between the ends of the adjoining segments by reversing the segments in each unit and connecting the two segments so as to attain a balanced distribution of forces on each segment unit. Thus, any action between segments in one ring unit which might tend to separate the contacting ends 72 and 74 in that ring unit is prevented because of the balancing action of the segments in the other ring unit.

Segments 66 and 68 may be shifted from the position illustrated in Fig. 3 to that indicated in Fig. 7 with the ends 72 and 74 lying in parallel and abutting relation in all positions of adjustment. At the same time, the ends of the segments in one ring unit are arranged in overlapping relation with the segments in the other ring unit so that a fluid-tight condition is maintained at all times.

When first applied, the segments are bored to exactly conform to the diameter and curvature of the piston rod 14. In Fig. 3, I have indicated by line 104 excess material which may be bored out to fit different sizes of piston rods. It is customary to bore each ring to fit the rod to which it is applied. Should the contacting areas of the segments 66 and 68 with respect to the piston rod 14 become localized through wear of the rod, my arrangement of segments provides a multiple point contact about the piston rod so that good sealing relation is maintained. In ring units 62 and 64 comprising three segments each, six points of contact are attained. The point 111 indicates the localized point of contact with the piston rod.

In operation, the segments 66 and 68 will wear and conform to the shape of the piston rod 14. The wear on the segments is not uniformly distributed from end to end because of the pivotal action of the segments. The modified segments in Fig. 7 indicate the distribution of the wear. Should the piston rod 14 wear to a taper, the contacting surfaces of the segments would not exactly conform to the curvature of the rod in all positions thereof, but the multiple point contact between the segments and the rod provides an embracing relation which tends to prevent excessive loss of steam. Referring again to Fig. 3, one end of each segment is cut off at 108 to provide a blunt end for eliminating the usual feather edge.

Referring to Fig. 7, it will be noted that the spring 84 associated with each segment unit is incapable of longitudinal displacement because of the fact that one end of the spring is restrained from movement by one abutment 88, while the opposite end is restrained by the abutment 88 of the associated segment. Thus, the springs 84 are prevented from shifting to a position between the abutments and the carrier ring, which shifting would impair the operation of the segments.

Figure 8:
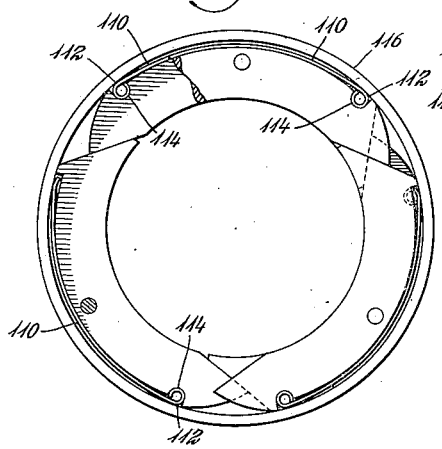
Fig. 8 is a view illustrating a similar type of segment in association with a different type of pressure spring.
Figure 9:
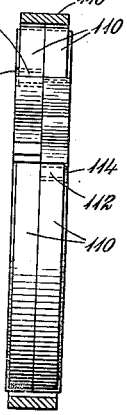
Fig. 9 is an edge view of the structure of Fig. 8, with certain parts removed.

Figs. 8 and 9 illustrate a slightly different form of spring construction, one in which each segment is provided with an individual spring 110. Each spring has one end bent back upon itself to provide a bead 112 which lies within a recess 114 in its associated segment. The beaded ends of the springs are reversed in connection with the segments in a pivotally connected unit. The beads 112 and the recesses 114 co-operate to prevent longitudinal shifting of the springs. In an arrangement according to Fig. 8, the recessed ends of the segments pivot outwardly so that the springs are held in their recesses.

Figure 11:
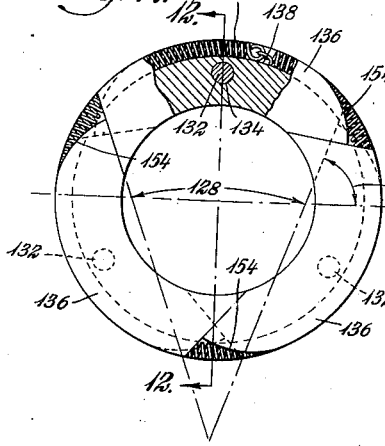
Fig. 11 is a detail view of an assembly of segments designed for rods of smaller diameter.
Figure 12:
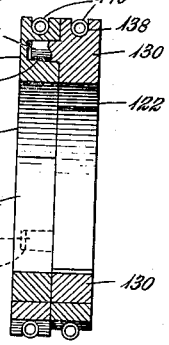
Fig. 12 is a sectional view along the line 12—12 of Fig. 11.

Figs. 11 and 12 illustrate a metallic packing capable of being manufactured by die casting methods. The packing comprises two ring units 122 and 124, each comprising at least three segments of the same type as those illustrated in Fig. 6. For smaller rods, the angle indicated at 128 is slightly greater than that illustrated at 92, in Fig. 3. For a piston rod having a four inch diameter (Fig. 3), I prefer to make the angle 129 82°, while the angle 131 (Fig. 11) is approximately 74° for a two inch rod. While other angles may be used, a construction as disclosed provides a more effective overlapping relation between the segments.

In Fig. 12, I illustrate the manner in which the two segments comprising a segment unit are pivotally connected. The segment 130 is provided with an integral dowel pin 132 arranged to lie within a hole 134 in the companion segment 136. The dowel pin 132 terminates short of the bottom of the hole 134 to permit the two ring units 122 and 124 to lie in contact with each other. Both the dowel pin and the hole are tapered to permit separation in casting. In this form of construction, I provide the ring units 122 and 124 with peripheral grooves 138 for the reception of coiled endless springs 140. These springs operate to hold the segments in operative relation and to shift the segments to compensate wear.

Figure 10:
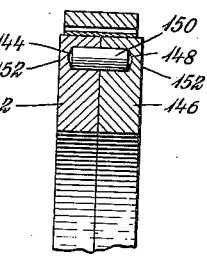
Fig. 10 is a sectional view of two segments illustrating a modified pivotal connection.

In Fig. 10, the segment 142 is provided with a hole 144 which extends partly through the segment. The segment 146 is provided with a similar hole 148. The dowel pin 150 is pressed into the hole 144 and is loosely positioned within the hole 148. This construction provides material 152 which tends to reenforce the segment in the locality of its pivotal connection. The pivotal connection illustrated in Fig. 12 is similar with the exception that the dowel pin 132 and the hole 134 are cast integrally with the segments 130 and 136, while in Fig. 10 both segments are drilled for accommodating the dowel pin 150.

While I have illustrated three segments in each ring unit, a larger number of segments may be employed. When the number is increased, I find it necessary to employ segment pressure rings of the type disclosed in Figs. 11 and 12. However, the segments may be pivotally connected notwithstanding the use of a larger number of segments than that illustrated. Each segment in all the forms has one end cut away at 154 to provide accommodation for the carrier ring in all positions of the segment.

Without further elaboration, the foregoing will so fully explain my invention that others may, by applying current knowledge, readily adapt the same for use under various conditions of service.

I claim:

1. In a metallic packing, a pair of adjoining rings, each comprising a plurality of similar segments having end faces extending substantially tangentially of the bore of the ring formed thereby, said tangential end faces of the segments of each ring being in slidable fitting contact and the end faces of the segments of one ring extending oppositely to those of the segments of the other ring, and means pivoting together pairs of overlapping segments of the rings, the construction and arrangement being such that tangential thrust on each segment balances the thrust on the segment pivoted thereto.

2. In a metallic packing, a pair of adjoining rings, each comprising a plurality of similar segments having end faces extending substantially tangentially of the bore of the ring formed thereby, said tangential end faces of the segments of each ring being in slidable fitting contact and the end faces of the segments of one ring extending oppositely to those of the segments of the other ring, means pivoting together pairs of overlapping segments of the rings, the construction and arrangement being such that tangential thrust on each segment balances the thrust on the segment pivoted thereto, a carrier ring peripherally enclosing said adjoining rings, and means between the adjoining rings and the carrier ring for urging the segments radially inwardly.

3. In a metallic packing, a pair of adjoining rings, each comprising a plurality of similar segments having end faces extending substantially tangentially of the bore of the ring formed thereby, said tangential end faces of the segments of each ring being in slidable fitting contact and the end faces of the segments of one ring extending oppositely to those of the segments of the other ring, means pivoting together pairs of overlapping segments of the rings, the construction and arrangement being such that tangential thrust on each segment balances the thrust on the segment pivoted thereto, a carrier ring peripherally enclosing said adjoining rings, and a coil spring for each adjoining ring and surrounding the segments thereof for urging the latter radially inwardly.

4. In a metallic packing, a pair of adjoining rings, each comprising a plurality of similar segments having end faces extending substantially tangentially of the bore of the ring formed thereby, said tangential end faces of the segments of each ring being in slidable fitting contact and the end faces of the segments of one ring extending oppositely to those of the segments of the other ring, means pivoting together pairs of overlapping segments of the rings, the construction and arrangement being such that tangential thrust on each segment balances the thrust on the segment pivoted thereto, a carrier ring peripherally enclosing said adjoining rings, spaced abutments on each segment, and leaf springs between the adjoining rings and the carrier ring for urging the segments radially inwardly and having their ends engageable with the abutments.

5. In a metallic packing, a pair of adjoining rings, each comprising a plurality of similar segments having end faces extending substantially tangentially of the bore of the ring formed thereby, said tangential end faces of the segments of each ring being in slidable fitting contact and the end faces of the segments of one ring extending oppositely to those of the segments of the other ring, means pivoting together pairs of overlapping segments of the rings, the construction and arrangement being such that tangential thrust on each segment balances the thrust on the segment pivoted thereto, a carrier ring peripherally enclosing said adjoining rings, each segment having a recess in the outer surface thereof and terminating in abutments, the recess of each pair of segments being aligned with each other, leaf springs having their ends engageable with the abutments and bridging the joints between the adjoining rings, and said springs disposed in the recesses and engaging the carrier ring for urging the segments radially inwardly.

6. In a metallic packing, a pair of adjoining rings, each comprising a plurality of similar segments having end faces extending substantially tangentially of the bore of the ring formed thereby, said tangential end faces of the segments of each ring being in slidable fitting contact and the end faces of the segments of one ring extending oppositely to those of the segments of the other ring, means pivoting together pairs of overlapping segments of the rings, the construction and arrangement being such that tangential thrust on each segment balances the thrust on the segment pivoted thereto, a carrier ring peripherally enclosing said adjoining rings, each segment having a recess in the outer surface thereof, a leaf spring for each segment of each pair and mounted in the recess thereof, each leaf spring having one end anchored to its segment, with the anchored ends of adjacent springs reversed with respect to each other, and said springs engaging the carrier ring for urging the segments radially inwardly.

7. In a metallic packing, a pair of adjoining rings, each comprising a plurality of similar segments having convergent end faces, said convergent end faces of the segments of each ring being in slidable fitting contact and the end faces of the segments of one ring extending oppositely to those of the segments of the other ring, relative movement between the contacting end faces of the segments being in directions substantially tangent to the bore of the ring formed thereby, and means pivoting together pairs of overlapping segments of the rings, the construction and arrangement being such that tangential thrust on each segment balances the thrust on the segment pivoted thereto.

JOHN BADEKER.